United States Patent
Morton et al.

(10) Patent No.: US 11,332,683 B2
(45) Date of Patent: *May 17, 2022

(54) ASPHALTENE SOLVATION AND DISPERSION PROCESS

(71) Applicant: Infineum International Limited, Abingdon (GB)

(72) Inventors: Colin Morton, Standford in the Vale (GB); Paul D. Kerby, Oxford (GB); Andrew C. Sutkowski, Norwich (GB); Krzysztof J. Maranski, Zagan (PL)

(73) Assignee: Infineum International Limited, Oxford (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/018,294

(22) Filed: Sep. 11, 2020

(65) Prior Publication Data

US 2021/0079309 A1 Mar. 18, 2021

(30) Foreign Application Priority Data

Sep. 17, 2019 (EP) .................................... 19197723

(51) Int. Cl.
| | | |
|---|---|---|
| *C10L 1/24* | (2006.01) | |
| *C10L 10/04* | (2006.01) | |
| *C10L 10/08* | (2006.01) | |
| *C10L 10/18* | (2006.01) | |
| *C10G 75/04* | (2006.01) | |
| *C10G 75/02* | (2006.01) | |
| *C09K 8/524* | (2006.01) | |

(52) U.S. Cl.
CPC ............. *C10L 1/2437* (2013.01); *C09K 8/524* (2013.01); *C10G 75/02* (2013.01); *C10G 75/04* (2013.01); *C10L 10/04* (2013.01); *C10L 10/08* (2013.01); *C10L 10/18* (2013.01); *C10G 2300/206* (2013.01); *C10G 2300/80* (2013.01)

(58) Field of Classification Search
CPC ........ C10L 1/2437; C10L 10/04; C10L 10/08; C10L 10/18; C09K 8/524; C10G 75/04; C10G 75/02; C10G 2300/206; C10G 2300/80; C10G 29/28; C08J 3/091; C08J 2395/00; C08J 2423/32; C08F 8/36; C08F 8/00; C08F 110/06; C08F 110/08; C07C 303/10; C07C 309/20
See application file for complete search history.

(56) References Cited

U.S. PATENT DOCUMENTS

| | | | | |
|---|---|---|---|---|
| 4,264,363 | A * | 4/1981 | Cech | C09D 5/08 |
| | | | | 106/14.28 |
| 4,440,579 | A * | 4/1984 | Eidem | C08K 5/42 |
| | | | | 106/274 |
| 9,255,043 | B2 * | 2/2016 | Ovalles | F17D 1/16 |
| 2008/0096772 | A1 * | 4/2008 | Wilkes | C09K 8/524 |
| | | | | 507/90 |
| 2008/0146476 | A1 * | 6/2008 | Harrison | C10M 159/24 |
| | | | | 508/567 |
| 2015/0218468 | A1 | 8/2015 | Ovaskainen et al. | |

FOREIGN PATENT DOCUMENTS

| | | | | |
|---|---|---|---|---|
| EP | 1091085 A1 * | 4/2001 | ............. | C10G 75/04 |
| EP | 1108775 A2 * | 6/2001 | ............. | C10G 31/00 |
| WO | WO-9113951 A1 * | 9/1991 | ............. | C10L 1/2437 |
| WO | WO-0127438 A1 * | 4/2001 | ............. | C10G 75/04 |

\* cited by examiner

*Primary Examiner* — Pamela H Weiss
(74) *Attorney, Agent, or Firm* — David M. Weisberg

(57) ABSTRACT

The capacity of a crude oil to solvate and/or disperse asphaltenes is increased by providing a crude oil which includes an additive comprising (i) a poly(butylenyl)bezene sulphonic acid; or, (ii) a poly(propylenyl)benzene sulphonic acid; or, (iii) a combination of a poly(butylenyl)bezene sulphonic acid and a poly(propylenyl)benzene sulphonic acid.

17 Claims, No Drawings

ASPHALTENE SOLVATION AND DISPERSION PROCESS

CROSS-REFERENCE TO RELATED APPLICATIONS AND PRIORITY

This application claims priority to Foreign Application EP 19197723.0 filed Sep. 17, 2019 the disclosures of which are expressly incorporated herein by reference.

FIELD OF THE INVENTION

This invention relates to increasing the capacity of a crude oil to solvate anchor disperse asphaltenes in the crude oil. In particular, although not exclusively, the invention relates to enhancing the solubility and/or dispersibility of asphaltenes in a crude oil, especially a crude oil which has an asphaltene content.

More specifically, the invention relates to a method for increasing the capacity of a crude oil to solvate and/or disperse asphaltenes in the crude oil and/or a method for enhancing the solubility and/or dispersibility of asphaltenes in a crude oil, by adding one or more 4-poly(alkylenyl) benzene sulphonic acid derivative(s) as additive(s) to the crude oil. Further, the invention relates to the use of one or more 4-poly(alkylenyl)benzene sulphonic acid derivative(s) as additive(s) in a crude oil, especially a crude oil which has an asphaltene content, to increase the capacity of a crude oil to solvate and/or disperse asphaltenes in the crude oil and/or to enhance the solubility and/or dispersibility of asphaltenes in a crude oil, particularly such use, during extraction of a crude oil from a subterranean crude oil reservoir and/or during transportation of a crude oil to a petroleum refinery and/or during storage of a crude oil and/or during a blending operation of a crude oil with a different type of crude oil.

BACKGROUND OF THE INVENTION

A crude oil typically includes asphaltenes. Asphaltenes include molecules having a large number of different and complex structures. Typically, asphaltenes comprise high molecular weight aromatic molecules, such as unsaturated macromolecules primarily of carbon and hydrogen but also containing minor components such as sulfur, oxygen, nitrogen and/or various metals, particularly heavy metals. Asphaltenes are characterized in terms of their solubility in aromatic solvents, and they are more commonly defined as that portion of a crude oil, which is soluble in xylene and toluene, but insoluble in paraffinic solvents, such as heptane or pentane. Asphaltenes typically exist in crude oil as soluble species and/or in the form of a colloidal dispersion, through interactions with resins present in the crude oil (e.g. asphaltenes are solvated by interactions with the resins in a crude oil). Suitably, the solvation and/or dispersion of asphaltenes in a crude oil is delicately balanced and this balance, and the capacity of a crude oil to solvate and/or disperse asphaltenes therein, may be disturbed upon pressure changes, compositional changes (e.g. by blending two or more different crude oils together or blending a crude oil with a hydrocarbon fluid), or other mechanical or physical processing operations of a crude oil.

Crude oil from different geographical locations typically has its own unique physical properties (e.g. viscosity and volatility) and chemical composition (e.g. asphaltene content, sulfur content). Crude oil ranges in density and consistency, from relatively thin, light weight fluid oils to extremely thick, semi-solid heavy weight oils. Lower quality crude oils typically include a higher quantity of asphaltenes, and/or sulfur, compared with higher quality crude oils. Accordingly, it may be necessary to blend two or more different types of crude oil together to provide a crude oil blend having the desirable viscosity, volatility and chemical compositional characteristics to facilitate transport and/or storage of the crude oil. For example, it may be desirable to blend a lower quality heavy crude oil having a high viscosity and high asphaltene content with a higher quality light crude oil having a lower viscosity and lower asphaltene content and/or with a hydrocarbon oil, to facilitate ease of handling, transportation (e.g. by pipeline, tanker or ship) and/or storage of the lower quality heavy crude oil between the wellbore reservoir region and a petroleum refinery. However, it is recognised that mixing two different types of crude oil together may form a crude oil blend having a significantly lower capacity for solvating and/or dispersing asphaltenes. This diminished capacity for solvating and/or dispersing asphaltenes has been found to occur in such blends of crude oil, even when no asphaltene insolvency exists in either of the different types of crude oil alone constituting the blend.

Crude oil is extracted from a subterranean crude oil reservoir by forming a well. The extraction of crude oil from the reservoir may be facilitated by natural processes (e.g. underground pressure forcing the crude oil to the surface) and/or using secondary recovery processes and/or using enhanced recovery processes. Secondary recovery processes include injecting fluids (e.g. water, natural gas, air) into the reservoir to increase reservoir pressure; enhanced recovery processes include reducing the viscosity of the oil in the reservoir, for example, by injecting steam, surfactants and carbon dioxide into the reservoir. Suitably, crude oil during the extraction operation(s) is typically subjected to a number of different physiochemical processes which may diminish the capacity of the crude oil to solvate and/or disperse asphaltenes contained therein and/or reduce the solubility and/or dispersibility of asphaltenes in the crude oil.

The diminished capacity of a crude oil to solvate and/or disperse asphaltenes, and/or a reduction in the solubility and/or dispersibility of asphaltenes in a crude oil upon pressure changes, compositional changes, or other mechanical or physiochemical processing operations of a crude oil, presents a number of problems for: crude oil producers (commonly referred to as the upstream sector in the oil and gas industry); in the transportation of crude oils from the wellbore region to a petroleum refinery (e.g. by pipeline, rail, ship, oil tanker); in the storage of crude oils before the oil is refined at a petroleum refinery (e.g. storage at the wellbore region, storage at intermediate sectors between the wellbore region and a petroleum refinery, and storage at a petroleum refinery); and, in the processing of a crude oil before it is refined at a petroleum refinery (e.g. blending a crude oil with a different type of crude oil to faun a crude oil blend). For example, the diminished capacity of a crude oil to solvate or disperse asphaltenes, and/or a reduction in the solubility and/or dispersibility of asphaltenes in a crude oil, may promote the formation of asphaltene deposits that may plug and/or restrict oil flow in downhole tubulars, wellbores, choke off pipes, safety shut off valves, separator equipment, flow lines (e.g. pipelines), blending equipment, storage vessels and associated process transport mechanisms. To overcome these disadvantages, the equipment is ordinarily taken offline and cleaned mechanically or chemically cleaned, resulting in lost production time and increased operating costs.

Accordingly, there is a need to increase the capacity of a crude oil, and of a crude oil blend comprising two or more different types of crude oil, to solvate and/or disperse asphaltenes in the crude oil and/or crude oil blend, wherein such capacity may be lowered upon pressure changes, compositional or other mechanical or physical processing operations of a crude oil and crude oil blend; especially in respect of a crude oil or crude oil blend which has an asphaltene content. Further, there is a need to increase the solubility and/or dispersibility of asphaltenes in a crude oil, and in a crude oil blend comprising two or more different types of crude oil, wherein the solubility and dispersibility of asphaltenes in said crude oil and crude oil blend may be lowered upon pressure changes, compositional or other mechanical or physical processing operations of crude oil and crude oil blend; especially in respect of a crude oil or crude oil blend which has an asphaltene content. This will typically improve the overall efficiency and decrease operating costs for extracting, transporting, storing and/or processing of crude oil before it is refined in a petroleum refinery operation at a petroleum refinery.

SUMMARY OF INVENTION

The invention provides improvements for increasing the capacity of a crude oil to solvate and/or disperse asphaltenes in said crude oil. Further, the invention provides improvements for increasing the solubility and/or dispersibility of asphaltenes in a crude oil. Further, the invention provides such improvements in respect of a crude oil blend comprising two or more different types of crude oil. Suitably, the crude oil or said crude oil blend has an asphaltene content. Still further, the invention provides such improvements in respect of a refineable petroleum feedstock which includes a crude oil or said crude oil blend.

Thus, in a first aspect, the invention provides a method for enhancing the capacity of a crude oil to solvate and/or disperse asphaltenes in said crude oil, the method comprising adding an effective minor amount of Additive A or Additive B, or an effective minor amount of a combination of Additive A and Additive B, to the crude oil; wherein:
  (i) Additive A comprises one or more 4-poly(butylenyl) benzene sulphonic acid(s), wherein the poly(butylenyl) substituent group of greater than 50 mass % of said one or more 4-poly(butylenyl)benzene sulphonic acid(s) of Additive A, based on the total mass of all said one or more 4-poly(butylenyl)benzene sulphonic acid(s), has greater than or equal to 32 total carbon atoms in said substituent group, as determined by GC; and,
  (ii) Additive B comprises one or more 4-poly(propylenyl) benzene sulphonic acids, wherein the poly(propylenyl) substituent group of greater than 50 mass % of said one or more 4-poly(propylenyl)benzene sulphonic acid(s) of Additive B, based on the total mass of all said one or more 4-poly(propylenyl)benzene sulphonic acid(s), has greater than or equal to 21 total carbon atoms in said substituent group, as determined by GC.

Thus, in a second aspect, the invention provides a method for increasing the solubility and/or dispersibility of asphaltenes in a crude oil, the method comprising adding an effective minor amount of Additive A or Additive B, or an effective minor amount of a combination of Additive A and Additive B, to the crude oil; wherein:
  (i) Additive A, when present, is present in an effective minor amount of from 1 to 1000 ppm by mass, based on the total mass of the crude oil, and Additive A comprises one or more 4-poly(butylenyl)benzene sulphonic acid(s), wherein the poly(butylenyl) substituent group of greater than 50 mass % of said one or more 4-poly(butylenyl)benzene sulphonic acid(s) of Additive A, based on the total mass of all said one or more 4-poly(butylenyl)benzene sulphonic acid(s), has greater than or equal to 32 total carbon atoms in said substituent group, as determined by GC; and,
  (ii) Additive B, when present, is present in an effective minor amount of from 1 to 1000 ppm by mass, based on the total mass of the crude oil, and Additive B comprises one or more 4-poly(propylenyl)benzene sulphonic acids, wherein the poly(propylenyl) substituent group of greater than 50 mass of said one or more 4-poly(propylenyl)benzene sulphonic acid(s) of Additive B, based on the total mass of all said one or more 4-poly(propylenyl)benzene sulphonic acid(s), has greater than or equal to 21 total carbon atoms in said substituent group, as determined by GC.

In a third aspect, the invention provides the use, of an effective minor amount of Additive A or Additive B, or an effective minor amount of a combination of Additive A and Additive B, as an additive, or a combination of additives A and B, in a crude oil to enhance the capacity of a crude oil to solvate and/or disperse asphaltenes in said crude oil, wherein: Additive A comprises one or more 4-poly(butylenyl)benzene sulphonic acid(s), wherein the poly(butylenyl) substituent group of greater than 50 mass % of said one or more 4-poly(butylenyl)benzene sulphonic acid(s) of Additive A, based on the total mass of all said one or more 4-poly(butylenyl)benzene sulphonic acid(s), has greater than or equal to 32 total carbon atoms in said substituent group, as determined by GC; and, Additive B comprises one or more 4-poly(propylenyl)benzene sulphonic acids, wherein the poly(propylenyl) substituent group of greater than 50 mass % of said one or more 4-poly(propylenyl) benzene sulphonic acid(s) of Additive B, based on the total mass of all said one or more 4-poly(propylenyl)benzene sulphonic acid(s), has greater than or equal to 21 total carbon atoms in said substituent group, as determined by GC.

In a fourth aspect, the invention provides the use, of an effective minor amount of Additive A or Additive B, or an effective minor amount of a combination of Additive A and Additive B, as an additive, or a combination of additives A and B, in a crude oil to enhance the solubility and/or dispersibility of asphaltenes in said crude oil, wherein: Additive A comprises one or more 4-poly(butylenyl)benzene sulphonic acid(s), wherein the poly(butylenyl) substituent group of greater than 50 mass % of said one or more 4-poly(butylenyl)benzene sulphonic acid(s) of Additive A, based on the total mass of all said one or more 4-poly (butylenyl)benzene sulphonic acid(s), has greater than or equal to 32 total carbon atoms in said substituent group, as determined by GC; and, Additive B comprises one or more 4-poly(propylenyl)benzene sulphonic acids, wherein the poly(propylenyl) substituent group of greater than 50 mass % of said one or more 4-poly(propylenyl)benzene sulphonic acid(s) of Additive B, based on the total mass of all said one or more 4-poly(propylenyl)benzene sulphonic acid(s), has greater than or equal to 21 total carbon atoms in said substituent group, as determined by GC.

Suitably, in the method of the first and second aspects and/or use of the third and fourth aspects, the crude oil comprises a crude oil having an asphaltene content.

Suitably, in the method of the first aspect and/or use of the third aspect, the capacity of a crude oil to solvate and/or disperse asphaltenes is enhanced upon pressure changes, compositional or other mechanical or physical processing operations of the crude oil.

Suitably, in the method of the second aspect and/or use of the fourth aspect, the solubility and/or dispersibility of asphaltenes in a crude oil is enhanced upon pressure changes, compositional or other mechanical or physical processing operations of the crude oil.

Suitably, in the method of the first and second aspects and/or use of the third and fourth aspects, Additive A, when present, is present in an amount of from 1 to 10000, preferably 1 to 5000, more preferably 1 to 1000, even more preferably 1 to 500, even more preferably 1 to 100, even more preferably 1 to less than 100, ppm by mass, based on the total mass of the crude oil.

Suitably, in the method of the first and second aspects and/or use of the third and fourth aspects, Additive B, when present, is present in an amount of from 1 to 10000, preferably 1 to 5000, more preferably 1 to 1000, even more preferably 1 to 500, even more preferably 1 to 100, even more preferably 1 to less than 100, ppm by mass, based on the total mass of the crude oil.

Suitably, in the method of the first and second aspects and/or use of the third and fourth aspects, when a combination of Additive A and Additive B is used, the combined treat rate of Additive A and Additive B is from 2 to 10000, preferably 2 to 5000, more preferably 2 to 1000, more preferably 2 to 200, even more preferably 2 to less than 100, ppm by mass, based on the total mass of the crude oil.

Suitably, in the method of the first and second aspects and/or use of the third and fourth aspects, the crude oil comprises a single type of crude oil or a crude oil blend comprising two or more different types of crude oil. The single type of crude oil or crude oil blend may further include a hydrocarbon oil (i.e. not a crude oil).

Suitably, in the method of the first and second aspects and/or use of the third and fourth aspects, the crude oil comprises a single type of crude oil having an asphaltene content or a crude oil blend comprising two or more different types of crude oil, wherein at least one, preferably each of said different type of, crude oil has an asphaltene content.

Suitably, in the method of the first and second aspects and/or use of the third and fourth aspects, the crude oil represents, or forms part of, a refineable petroleum feedstock which may be refined in a petroleum refinery operation at a petroleum refinery.

Suitably, the crude oil comprises intermediate (light) crude oils, medium crude oils, heavy crude oils and shale oils, and combinations thereof.

Unexpectedly, it has been found that a significant increase in the capacity of a crude oil to solvate and/or disperse asphaltenes therein may be achieved by employing the particular 4-poly(butylenyl)benzene sulphonic acid(s) (Additive A) or the particular 4-poly(propylenyl)benzene sulphonic acid(s) (Additive B) as an additive in the crude oil, when a major amount of the poly(butylenyl) substituent groups of Additive A or a major amount of the poly (propylenyl) substituent groups of Additive B have the defined narrow total carbon chain length distribution, wherein such capacity of the crude oil may otherwise be lowered upon pressure changes, compositional or other mechanical or physical processing operations of the crude oil (e.g. forming a crude oil blend). Further, it has been found that a significant increase in the solubility and/or dispersibility of asphaltenes in a crude oil may be achieved by employing the particular 4-poly(butylenyl)benzene sulphonic acid(s) (Additive A) or the particular 4-poly(propylenyl)benzene sulphonic acid(s) (Additive B) as an additive in the crude oil, when a major amount of the poly(butylenyl) substituent groups of Additive A or a major amount of the poly(propylenyl) substituent groups of Additive B have the defined narrow total carbon chain length distribution, wherein the solubility and/or dispersibility of asphaltenes may otherwise be lowered in the crude oil upon pressure changes, compositional or other mechanical or physical processing operations of the crude oil (e.g. forming a crude oil blend). Still further, this technical effect is achievable by adding a relatively small amount (e.g. 1 to 1000, preferably 1 to less than 100, ppm by mass) of Additive A or Additive B to a crude oil. Suitably, the use of a relatively small amount (e.g. 1 to 1000, preferably 1 to less than 100, ppm by mass) of the particular 4-poly(butylenyl)benzene sulphonic acid(s) (Additive A) or the particular 4-poly(propylenyl)benzene sulphonic acid(s) (Additive B), in a crude oil typically significantly increases the capacity of crude oil to solvate and/or disperse asphaltenes therein, and/or a significantly increases the solubility and/or dispersibility of asphaltenes in a crude oil, compared with the crude oil not including either Additive A or Additive B.

The increased capacity of a crude oil to solvate and/or disperse asphaltenes therein, and/or the increased solubility and/or dispersibility of asphaltenes in a crude oil, may permit (i) increased amounts of asphaltenes to be solvated and/or dispersed in a crude oil; and/or, (ii) formation of a crude oil, or formation of a crude oil blend, having a defined asphaltene content wherein the asphaltenes are more stably solvated and/or dispersed therein (i.e. asphaltene precipitation from and/or agglomeration in the crude oil is reduced).

Still further, it has unexpectedly been found, the use of Additive A is much more effective than Additive B. Suitably, in the method of the first and second aspects and/or use of the third and fourth aspects, an effective minor amount of Additive A is added to a crude oil.

Although Additive A has been found to be more effective than Additive B, a combination of Additive A and Additive B, typically provides an effect which is at least comparable to the use of Additive A alone. Suitably, in the method of the first and second aspects and/or use of the third and fourth aspects, an effective minor amount of a combination of Additive A and Additive B is added to a crude oil.

Suitably, in in the method of the first and second aspects and/or use of the third and fourth aspects, Additive A or Additive B, or a combination of Additive A and Additive B, is each independently added to the crude oil before the crude oil is at a petroleum refinery or when the crude oil is at a petroleum refinery. Preferably, Additive A or Additive B, or a combination of Additive A and Additive B, is each independently added to the crude oil before the crude oil is at a petroleum refinery.

For the avoidance of doubt, when Additive A or Additive B, or a combination of Additive A and Additive B, is each independently added to a crude oil we mean that each additive or the combination of additives may be independently added directly to a crude oil(s) as defined herein, each additive or the combination of additives may be independently added to a crude oil blend as defined herein, and/or each additive or the combination of additives may be independently added to a refineable petroleum feedstock comprising a crude oil or crude oil blend as defined herein.

Suitably, Additive A or Additive B, or a combination of Additive A and Additive B, is each independently added to a crude oil at one or more crude oil production and/or processing stages before the crude oil arrives at a petroleum refinery. Suitably, Additive A or Additive B, or a combination of Additive A and Additive B, is each independently added to a crude oil at one or more crude oil production and/or processing stages before the crude oil arrives at a petroleum refinery selected from: (i) to a crude oil residing in a subterranean crude oil reservoir, for example, during the extraction process by injecting the additive(s) into the crude oil reservoir via the wellbore; (ii) to a crude oil during the storage of the crude oil, for example, to a crude oil being stored in storage tanks, which tanks may be located at the wellbore region, or at intermediate locations between the wellbore region and petroleum refinery; (iii) to a crude oil during the transportation of a crude oil, for example, to a crude oil being transported by pipeline, ship, rail, oil tanker, especially to a crude oil being transported from the wellbore region to a petroleum refinery; (iv) to a crude oil before or during the processing of a crude oil before it arrives at a petroleum refinery, for example, to a crude oil being blended with a different type of crude oil, and/or hydrocarbon fluid, to form a crude oil blend. Preferably, Additive A or Additive B, or a combination of Additive A and Additive B, is each independently added to the crude oil at one or more crude oil production process stages selected from: (i) to a crude oil during the storage of a crude oil; (ii) to a crude oil during the transportation of a crude oil, especially to a crude oil being transported from the wellbore region to a petroleum refinery; and, (iii) to a crude oil before or during the processing of a crude oil before it arrives at a petroleum refinery, for example, to a crude oil being blended with a different type of crude oil, and/or hydrocarbon fluid, to form a crude oil blend.

Suitably, in in the method of the first and second aspects and/or use of the third and fourth aspects, when a combination of Additive A and Additive B is added to a crude oil, Additive A may be added to a crude oil at the same one or more crude oil production and/or processing stages as Additive B, or Additive A may be added to a crude oil at a different one or more crude oil production and/or processing stages than Additive B. Preferably, Additive A and Additive B are added to a crude oil at the same one or more crude oil production and/or processing stages.

Suitably, in the method of the first and second aspects and/or use of the third and fourth aspects, when a combination of Additive A and Additive B is added to a crude oil, Additive A and Additive B may be added essentially simultaneously to a crude oil, or Additive A and Additive B may be added sequentially to a crude oil. Preferably, Additive A is added to a crude oil essentially simultaneously with Additive B. More preferably, Additive A and Additive B are in the form of a single additive package.

Additive A and/or Additive B may be added to a crude oil by techniques well known to those skilled in the art, for example, the additive(s) may be blended into a crude oil, the additive(s) may be introduced into flowlines transporting a crude oil, the additive(s) may be injected into a crude oil, for example, into a crude oil reservoir via the wellbore.

Suitably, in the method of the first and second aspects and/or use of the third and fourth aspects, the crude oil is at ambient temperature (i.e. at a temperature of its immediate surroundings and without application of heat from an additional external heat source). Crude oil in a crude oil reservoir may be at temperature of up to 150 The transportation, storage and processing of crude oil before the crude oil is refined at a petroleum refinery is dependent upon geographical location.

Suitably, in the method of the first and second aspects and/or use of the third and fourth aspects, the crude oil is at a temperature of less than 40, preferably less than or equal to 35, ° C.

Suitably, in any one of the first to fourth aspects of the invention, the poly(butylenyl) substituent group of greater than or equal to 55, preferably greater than or equal to 60, more preferably greater than or equal to 65, mass % of said one or more 4-poly(butylenyl)benzene sulphonic acid(s) of Additive A, based on the total mass of all said one or more 4-poly(butylenyl)benzene sulphonic acid(s), has greater than or equal to 32 total carbon atoms in said substituent group, as determined by GC.

Suitably, in any one of the first to fourth aspects of the invention, the poly(butylenyl) substituent group of less than or equal to 35, preferably less than or equal to 30, more preferably less than or equal to 25, more preferably less than or equal to 20, mass % of said one or more 4-poly(butylenyl) benzene sulphonic acid(s) of Additive A, based on the total mass of all said one or more 4-poly(butylenyl)benzene sulphonic acid(s), has greater than or equal to 60 total carbon atoms in said substituent group, as determined by GC.

Suitably, in any one of the first to fourth aspects of the invention, the poly(butylenyl) substituent group of from 40 to 70, preferably 40 to 65, mass % of said one or more 4-poly(butylenyl)benzene sulphonic acid(s) of Additive A, based on the total mass of all said one or more 4-poly (butylenyl)benzene sulphonic acid(s), has from 32 to 56 total carbon atoms in said substituent group, as determined by GC.

Suitably, in any one of the first to fourth aspects of the invention, the poly(butylenyl) substituent group of said one or more 4-poly(butylenyl)benzene sulphonic acid(s) of Additive A includes a poly(butylenyl) substituent group having 32, 36, 40, 44 and/or 48, preferably 32, 36 and/or 40, total carbon atoms, as determined by GC.

Suitably, in any one of the first to fourth aspects of the invention, Additive A has a number average molecular weight ($M_n$) of from 550 to 800 daltons, as determined by the liquid-liquid extraction and potentiometric titration method described herein, preferably a number average molecular weight ($M_n$) of 550 to 800 daltons and a polydispersity index of 1.1. to 1.5.

Suitably, in any one of the first to fourth aspects of the invention, the poly(butylenyl) substituent group of said one or more 4-poly(butylenyl)benzene sulphonic acids of Additive A is derived from the polymerization of but-1-ene.

Suitably, the poly(butylenyl) substituent group of said one or more 4-poly(butylenyl)benzene sulphonic acid(s), Additive A, has a branched chain structure. By "branched chain structure" we mean the poly(butylenyl) substituent group consists of a branched chain butanediyl repeating radical. The poly(butylenyl) substituent group may be regarded as consisting essentially of a relatively long straight acyclic alkyl chain bonded to the benzene ring and said alkyl chain is further substituted by two or more methyl and or ethyl groups along the length of the chain (i.e. the branching is along the relatively long alkyl chain by virtue of pendant methyl and/or ethyl substituent groups). It has been found that when Additive A includes such a branched chain poly (butylenyl) substituent group, then this typically further reduces fouling by the feedstock, asphaltene agglomeration (or flocculation) and/or asphaltene precipitation in and/or from the feedstock when the feedstock is heated at an elevated temperature, compared to the use of poly(alkylenyl)benzene sulphonic acid additive(s) in which the poly (alkylenyl) substituent group is an essentially straight carbon chain.

Suitably, in any one of the first to fourth aspects of the invention, a highly preferred Additive A comprises one or more 4-poly(butylenyl)benzene sulphonic acids, wherein the poly(butylenyl) substituent group is derived by polymerising but-1-ene, the poly(butylenyl) substituent group has a branched chain structure, the poly(butylenyl) substituent group of greater than or equal to 55 mass % of said one or more 4-poly(butylenyl)benzene sulphonic acid(s) has greater than or equal to 32 total carbon atoms in said substituent group, the poly(butylenyl) substituent group of from 40 to 65 mass % of said one or more 4-poly(butylenyl) benzene sulphonic acid(s) has from 32 to 56 total carbon atoms in said substituent group, and the poly(butylenyl) substituent group comprises a poly(butylenyl) substituent group having 32, 36 and/or 40 total carbon atoms. Preferably, in such a highly preferred Additive A, Additive A has a number average molecular weight ($M_n$) of from 550 to 800 daltons and a polydispersity index of from 1.1 to 1.5.

Suitably, in any one of the first to fourth aspects of the invention, the poly(propylenyl) substituent group of greater than or equal to 55, preferably greater than or equal to 60, more preferably greater than or equal to 65, more preferably greater than or equal to than 70, even more preferably greater than or equal to than 75, mass % of said one or more 4-poly(propylenyl)benzene sulphonic acid(s) of Additive B, based on the total mass of all said one or more 4-poly (propylenyl)benzene sulphonic acid(s), has greater than or equal to 21 total carbon atoms in said substituent group, as determined by GC.

Suitably, in any one of the first to fourth aspects of the invention, the poly(propylenyl) substituent group of less than or equal to 30, preferably less than or equal to 25, more preferably less than or equal to 20, mass % of said one or more 4-poly(propylenyl)benzene sulphonic acid(s) of Additive B, based on the total mass of all said one or more 4-poly(propylenyl)benzene sulphonic acid(s), has greater than or equal to 30 total carbon atoms in said substituent group, as determined by GC.

Suitably, in any one of the first to fourth aspects of the invention, the poly(propylenyl) substituent group of from 60 to 95, preferably 65 to 95, more preferably 67 to 90, mass % of said one or more 4-poly(propylenyl)benzene sulphonic acid(s) of Additive B, based on the total mass of all said one or more 4-poly(propylenyl)benzene sulphonic acid(s), has from 21 to 27 total carbon atoms in said substituent group, as determined by GC.

Suitably, in any one of the first to fourth aspects of the invention, the poly(propylenyl) substituent group of said one or more 4-poly(propylenyl)benzene sulphonic acid(s) of Additive B includes a poly(propylenyl) substituent group having 21, 24 and for 27 total carbon atoms, as determined by GC.

Suitably, in any one of the first to fourth aspects of the invention, Additive B has a number average molecular weight (Me) of 400 to 600 daltons, as determined by the liquid-liquid extraction and potentiometric titration method described herein.

Suitably, in any one of the first to fourth aspects of the invention, the poly(propylenyl) substituent group of said one or more 4-poly(propylenyl)benzene sulphonic acid(s) of Additive B is derived from the polymerization of prop-1-ene.

Suitably, the poly(propylenyl) substituent group of said one or more poly(propylenyl)benzene sulphonic acids, Additive B, has a branched chain structure, i.e. the poly (propylenyl) substituent group consists of the branched propanediyl repeating radical. The poly(propylenyl) substituent group may be regarded as consisting essentially of a relatively long straight acyclic alkyl chain bonded to the benzene ring and said alkyl chain is further substituted by two or more methyl groups along the length of the chain (i.e. the branching is along the relatively long alkyl chain by virtue of pendant methyl substituent groups).

Suitably, in any one of the first to fourth aspects of the invention, a highly preferred Additive B comprises one or more 4-poly(propylenyl)benzene sulphonic acids, wherein the poly(propylenyl) substituent group is derived by polymerising prop-1-ene, the poly(propylenyl) substituent group has a branched chain structure, the poly(propylenyl) substituent group of greater than or equal to 60 mass % of said one or more 4-poly(propylenyl)benzene sulphonic acid(s) has greater than or equal to 21 total carbon atoms in said substituent group, the poly(propylenyl) substituent group of from 65 to 95 mass % of said one or more 4-poly(propylenyl)benzene sulphonic acid(s) has from 21 to 27 total carbon atoms in said substituent group, and the poly(propylenyl) substituent group includes a poly(propylenyl) substituent group having 21, 24 and/or 27 total carbon atoms. Preferably, in such a highly preferred Additive B, Additive B has a number average molecular weight ($M_n$) of from 400 to 600 daltons.

Suitably, when a combination of Additive A and Additive B is used in any one of the first to fourth aspects of the invention, the mass:mass ratio of Additive A to Additive B is in the range of 20:1 to 1:20, such as 10:1 to 1:10, preferably 3:1 to 1:3. Most preferably, Additive A is used in an amount in excess of Additive B and the mass:mass ratio of Additive A to Additive B is in the range of 20:1 to 1:1, such as 10:1 to 1:1, preferably 3:1 to 1:1.

Suitably, Additive A, Additive B, and a combination of Additive A and Additive B, are each independently soluble or dispersible in the crude oil.

Definitions

In this specification, the following words and expressions, if and when used, shall have the meanings ascribed below:

"Active ingredients" or "(a.i.)" refers to additive material that is not diluent or solvent;

"comprising" or any cognate word specifies the presence of stated features, steps, or integers or components, but does not preclude the presence or addition of one or more other features, steps, integers, components or groups thereof. The expressions "consists of" or "consists essentially of" or cognates may be embraced within "comprises" or any cognate word. The expression "consists essentially of" permits inclusion of substances not materially affecting the characteristics of the composition to which it applies. The expression "consists of" or cognates means only the stated features, steps, integers components or groups thereof are present to which the expression refers;

"Ashless" in relation to an additive means the additive does not include a metal;

"Ash-containing" in relation to an additive means the additive includes a metal;

"Crude oil" means the hydrocarbon fossil fuel oil located underground which is extracted and refined in a petroleum refinery operation at a petroleum refinery. The term "crude oil" embraces a single type of crude oil or a crude oil blend comprising two or more different types of crude oil. Crude oil embraces intermediate (light) crude oils, medium crude oils, heavy crude oils and shale oils;

"Crude oil having an asphaltene content" means a crude oil, as defined herein, which includes asphaltenes;

"Capacity of a crude oil to solvate and/or disperse asphaltenes" means the ability of a crude oil to solvate and/or disperse asphaltenes. The capacity and enhanced capacity of a crude oil to solvate and/or disperse asphaltenes is assessed by the crude oil asphaltene stability test as described herein;

"Enhancing the capacity of a crude oil to solvate and/or disperse asphaltenes" means increasing the ability of a crude oil to solvate and/or disperse asphaltenes when such ability is lowered upon pressure changes, compositional or other mechanical or physical processing operations of the crude oil (e.g. forming a crude oil blend from two or more different types of crude oil). The enhanced capacity may permit increased amounts of asphaltenes to be solvated and/or dispersed in a crude oil. Alternatively, or additionally, the enhanced capacity may permit formation of a crude oil, or formation of a crude oil blend, having a defined asphaltene content wherein the asphaltenes are more stably solvated and/or dispersed (i.e. asphaltene precipitation from and/or agglomeration in the crude oil is reduced);

"Increasing the solubility and/or dispersibility of asphaltenes in a crude oil" means increasing the solubility and/or dispersibility of asphaltenes in a crude oil when such solubility and/or dispersibility is lowered upon pressure changes, compositional or other mechanical or physical processing operations of the crude oil (e.g. forming a crude oil blend from two or more different types of crude oil). The increased solubility and/or dispersibility is assessed by the crude oil asphaltene stability test as described herein;

"Hydrocarbon fluid" means a hydrocarbon liquid or oil which is not a crude oil;

"Petroleum refinery operation" means any process which is, or can be, employed in refining a petroleum feedstock (e.g. a crude oil), such as any process employed in an oil refinery operation. Petroleum refining operation embraces any process which is, or can be, employed in refining a crude oil, crude oil blends comprising two or more different types of crude oils and the further refining of fractions obtained from refining crude oil and crude oil blends. Petroleum refinery operations typically include, but are not limited to, the following processing units, components and/or apparatus: a desalting unit to remove inorganic salts from the feedstock (i.e. crude oil); heat transfer components such as a heat exchanger, a furnace, a crude preheater, a coker preheater, to heat the petroleum feedstock; an atmospheric distillation unit to distil the feedstock (i.e. crude oil) into various fractions; a vacuum distillation unit to further distil the heavy bottom fractions from the atmospheric distillation unit; a catalytic cracking unit (e.g. fluid catalytic cracking unit) to break larger molecules into smaller, lighter hydrocarbon fractions; a catalytic hydrocracking unit to upgrade heavier aromatic and unsaturated fractions from the distillation units to gasoline, jet fuel and gasoil; a visbreaker unit to upgrade the heavy bottom fractions from the vacuum distillation unit by thermally cracking them into lighter hydrocarbon fractions; a coking unit (e.g. delayed coking, fluid coking, flexi-coking unit) to thermally crack very heavy residual oil fractions from the distillation units, especially vacuum distillation unit, to end-products, such as petroleum coke, naptha and diesel oil by-products; a hydrotreater to desulfurize fractions from the distillation units; a catalytic reforming unit to convert desulfurized fractions to higher-octane molecules; an isomerization unit to convert linear molecular fractions into higher-octane branched molecular fractions;

"Refineable petroleum feedstock" means a petroleum feedstock which is refined in a petroleum refinery operation at a petroleum refinery and, in the context of the invention, includes a crude oil. The term "refineable petroleum feedstock" does not include the ultimate refined commercial end-products of a petroleum refinery operation which are not subjected to a further refining operation, such as gasoline and diesel fuels, light and heavy naphtha, kerosene, heavy fuel oils, and lubricating oils.

"Refineable petroleum feedstock having an asphaltene content" means a refineable petroleum feedstock, as defined herein, which includes asphaltenes;

"Hydrocarbyl group" means a univalent radical that contains hydrogen and carbon atoms only and it is bonded to the remainder of the compound directly via a single carbon atom. The term "hydrocarbyl group" includes "alkyl", "alkylenyl", "alkenyl", "allyl" and "aryl" groups. Preferably, the hydrocarbyl group is an aliphatic hydrocarbyl group, more preferably the hydrocarbyl group is a saturated aliphatic hydrocarbyl group, even more preferably a branched-chain saturated aliphatic hydrocarbyl group, even more preferably a branched-chain alkyl group, even more preferably a branched-chain acyclic alkyl group;

"Alkyl group" means a univalent alkyl radical (i.e. a monovalent hydrocarbon group containing no double or triple bonds) which is bonded to the remainder of the compound directly via a single carbon atom. Preferably, the alkyl group is a branched-chain acyclic alkyl group.

"Alkylene" is synonymous with "alkanediyl" and means a bivalent saturated hydrocarbon radical derived from an alkane by removal of a hydrogen atom from two different carbon atoms (i.e. a divalent hydrocarbon radical containing no double or triple bonds); it may be linear or branched.

"Poly(alkylene)" is synonymous with "poly(alkene)" and means a polymer containing the appropriate alkanediyl repeating radical. Such polymers may be formed by polymerization of the appropriate alkene (e.g. poly(butylene) may be formed by polymerizing but-1-ene, but-2-ene and/or 2-methyl propene; and poly(propylene) may be formed by polymerizing propene).

"Poly(alkylenyl)" substituent group means a univalent polymer substituent group containing the appropriate alkanediyl repeating radical which is bonded to the rest of the compound via a single carbon atom. Suitably, a poly(alkylenyl) group may be formed from the corresponding poly(alkylene) (e.g. a poly(butylenyl) group may be formed from poly(butylene), a poly(propylenyl) group may be formed from poly(propylene);

Reference to a group or compound being a particular polymer (e.g. poly(propylenyl) group, poly(butylenyl) group, poly(butylene), poly(propylene)) encompasses polymers that preferably consist of the respective alkanediyl repeating radical, but also less preferably those which contain primarily the respective alkanediyl repeating radical along with negligible amounts of other substitutions and/or interruptions along the polymer chain. In other words, reference to a group being a poly(butylenyl) group or poly(propylenyl) in its broadest aspect does not require that the group consist of 100% butanediyl or 100 propanediyl, respectively, repeating radicals without, for example, any linking groups, substitutions, or impurities. Such impurities or other substituents may be present in relatively minor amounts provided they do not materially affect the performance of the additive compared with the same additive containing the respective alkanediyl repeating radical at 100% purity;

"Alkene" is synonymous with "alkylene" and means a hydrocarbon compound which includes one or more carbon to carbon double bonds, such as propylene or propene, prop-1-ene, butylene or butene, and but-1-ene;

"Alkenyl group" means a monovalent hydrocarbon radical which includes one or more carbon to carbon double bonds and is bonded to the remainder of the compound directly via a single carbon atom;

"halo" or "halogen" includes fluoro, chloro, bromo and iodo;

"oil-soluble" or "oil-dispersible", or cognate terms, used herein do not necessarily indicate that the compounds or additives are soluble, dissolvable, miscible, or are capable of being suspended in a crude oil in all proportions. These do mean, however, that Additive A, Additive B and a combination of Additive A and Additive B are, for example, soluble or stably dispersible in a crude oil to an extent sufficient to exert their intended effect. Moreover, the additional incorporation of other additives may also permit incorporation of higher levels of a particular additive(s), if desired;

"major amount" means in excess of 50 mass %, preferably 60 mass % or more, more preferably 70 mass % or more, even more preferably 80 mass % or more, of a composition;

"minor amount" means less than 50 mass %, preferably less than or equal to 40 mass %, more preferably less than or equal to 30 mass %, even more preferably less than or equal to 20 mass %, of a composition;

"effective amount" in respect of an additive, or combination of additives, means an amount of such additive(s) in a composition that is effective to provide, and provides, the desired technical effect;

"ppm" means parts per million by mass, based on the total mass of the composition;

"TBN" in relation to an additive component or of a composition, means total base number (mg KOH/g) as measured by ASTM D2896;

"$KV_{100}$" means kinematic viscosity at 100° C. as measured by ASTM D445;

$M_n$ means number average molecular weight. $M_n$ of Additive A and Additive B may be determined by the liquid-liquid extraction and two-phase potentiometric titration method described herein. $M_n$ of the poly(butylene) used to synthesise Additive A may be determined by gel permeation chromatography; $M_n$ of the poly(propylene) used to synthesise Additive B may be determined by gas chromatography (GC) using a flame ionization detector (FID) and simulated distillation in accordance with ASTM D2887, as described herein;

$M_w$ means weight average molecular weight. $M_w$ of Additive A and Additive B may be determined by gas chromatography (GC) and simulated distillation in accordance with ASTM D2887 using a flame ionization detector (FID), as described herein. $M_w$ of the respective polybutylene) and poly(propylene) used to synthesise Additive A and Additive B may be determined by GC using the same method;

"Polydispersity index" of a polymeric entity means $M_w/M_n$ of the polymeric entity and represents an index of the breadth of molecular weight distribution.

The mass % of the poly(butylenyl) substituent group having a particular total number of carbon atoms in Additive A, based on the total mass of the one or more 4-poly (butylenyl)benzene sulphonic acids of Additive A, is determined by measuring the mass distribution of the one or more 4-poly(butylenyl)benzene sulphonic acids of Additive A by gas chromatography (GC) and simulated distillation in accordance with ASTM D2887 using a flame ionization detector (FID), as described herein;

The mass % of the poly(propylenyl) substituent group having a particular total number of carbon atoms in Additive B, based on the total mass of the one or more 4-poly (propylenyl)benzene sulphonic acids of Additive B, is determined by measuring the mass distribution of the one or more 4-poly(propylenyl)benzene sulphonic acids of Additive A by gas chromatography (GC) and simulated distillation in accordance with ASTM D2887 using a flame ionization detector (FID), as described herein;

All percentages reported are mass % on an active ingredient basis, i.e. without regard to carrier or diluent oil, unless otherwise stated.

Also, it will be understood that various components used, essential as well as optimal and customary, may react under conditions of formulation, storage or use and that the invention also provides the product obtainable or obtained as a result of any such reaction.

Further, it is understood that any upper and lower quantity, range and ratio limits set forth herein may be independently combined. Accordingly, any upper and lower quantity, range and ratio limits set forth herein associated with a particular technical feature of the present invention may be independently combined with any upper and lower quantity, range and ratio limits set forth herein associated with one or more other particular technical feature(s) of the present invention. Furthermore, any particular technical feature of the present invention, and all preferred variants thereof, may be independently combined with any other particular technical feature(s), and all preferred variants thereof, irrespective of whether such features are presented as preferred or not.

Also, it will be understood that the preferred features of each aspect of the present invention are regarded as preferred features of each and every other aspect of the present invention.

DETAILED DESCRIPTION OF THE INVENTION

Additive A

Additive A is one or more 4-poly(butylenyl)benzene sulphonic acid(s). The one or more 4-poly(butylenyl)benzene sulphonic acid(s) have a single sulphonic acid group and a single substituent group being the poly(butylenyl) substituent group attached to the para-position of the benzene ring with respect to the sulphonic acid group (i.e. the remainder of the benzene ring is not substituted and includes hydrogen atoms). It has been found that use of such mono-substituted one or more 4-poly(butylenyl)benzene sulphonic acid(s) typically increases the capacity of a crude oil to solvate and/or disperse asphaltenes, and/or increases the solubility and/or dispersancy of asphaltenes in a crude oil, compared to the use of one or more 4-poly(alkylenyl) benzene sulphonic acid additive(s) which also include one or more further alkyl substituents ortho and/or meta to the poly(alkylenyl) substituent group (i.e. mono-substituted 4-poly(butylenyl)benzene sulphonic acid(s) are typically more effective).

The one or more 4-poly(butylenyl)benzene sulphonic acid(s) (Additive A) includes the sulphonic acid group as the free acid. Additive A is ashless and does not include salts (e.g. metal salts) of the sulphonic acid.

Suitably, Additive A is derived from the polymerization of butene, preferably but-1-ene.

Typically, Additive A may be synthesized by standard experimental techniques which are well-known to those skilled in the art, for example, the intermediate one or more 4-poly(butylenyl)benzene(s) having the desired mass % of poly(butylenyl) substituent group having a particular total number of carbon atoms may be synthesized by reacting butene, especially but-1-ene, with benzene using a Friedal-Crafts reaction (e.g. using a Friedal-Crafts catalyst such as a slurry of $AlCl_3$/HCl, at a reduced temperature, such as 3 to 10° C.). The intermediate one or more 4-poly(butylenyl)benzene(s) may then be sulphonated with a sulphonating agent (e.g. oleum, $SO_2$, $SO_3$), using standard techniques, to form the one or more 4-poly(butylenyl)benzene sulphonic acid(s) of Additive A having the desired characteristics, especially the desired mass % of poly(butylenyl) substituent group with a particular total number of carbon atoms. Suitably, the integrity of the poly(butylenyl) substituent group of the intermediate one or more poly(butylenyl)benzene(s) (e.g. the mass % of poly(butylenyl) substituent group having a particular total number of carbon atoms) is essentially maintained during the sulphonation reaction of the intermediate. Accordingly, the mass % of poly(butylenyl) substituent group having a particular total number of carbon atoms in the intermediate one or more 4-poly(butylenyl)benzene(s) is essentially identical to the mass % of poly(butylenyl) substituent group having a particular total number of carbon atoms in the one or more 4-poly(butylenyl)benzene sulphonic acid(s) of Additive A.

The appropriate poly(butylene) reactant used to form the intermediate one or more 4-poly(butylenyl)benzene(s) may be produced by polymerizing butene, particularly but-1-ene, using an appropriate catalyst system e.g. $EtAlCl_3$ and HCl. A suitable source of butene, particularly but-1-ene, is the Raffinate II stream obtained as a by-product from the synthesis of poly(isobutylene), for example as disclosed in U.S. Pat. No. 4,952,739. Suitably, the characteristics of the poly(butylene) reactant (e.g. $M_n$, $M_w$, mass % of poly(butylene) having a particular number of total carbon atoms) should be substantially the same as the corresponding desired characteristics of the poly(butylenyl) substituent group in the intermediate one or more 4-poly(butylenyl)benzene(s) and in the one or more 4-poly(butylenyl)benzene sulphonic acid(s) of Additive A. Suitably, a preferred poly(butylene) is obtained by polymerizing but-1-ene wherein the poly(butylene) has: (i) a $M_n$ of from 450 to 650, preferably 500 to 600, daltons as measured by gel permeation chromatography (see W. W. Yau, J. J. Kirkland and D. D. Bly, "Modern Size Exclusion Liquid Chromatography", John Wiley and Sons, New York, 1979); (ii) a polydispersity of from 1.1 to 1.5, preferably 1.2 to 1.4; (iii) greater than 55, preferably greater than 60, mass % of the poly(butylene), based on the total mass of poly(butylene), has greater than or equal to 32 total carbon atoms as determined by GC in accordance with ASTM D2887; and, (iv) less than 35 mass % of the poly(butylene), based on the total mass of poly(butylene), has greater than or equal to 60 total carbon atoms as determined by GC in accordance with ASTM D2887.

Suitably, a high proportion of the poly(butylenyl) substituent groups of Additive A have a relatively narrow total carbon chain length distribution in which the poly(butylenyl) substituent group of greater than or equal to 50, preferably greater than or equal to 55, more preferably greater than or equal to 60, more preferably greater than or equal to 65, mass % of said one or more 4-poly(butylenyl)benzene sulphonic acids, based on the total mass of all said one or more 4-poly(butylenyl)benzene sulphonic acids, has greater than or equal to 32 total carbon atoms in said substituent group, as determined by GC in accordance with ASTM D2887. Suitably, the poly(butylenyl) substituent group of less than or equal to 35, preferably less than or equal to 30, more preferably less than or equal to 25, more preferably less than or equal to 20, mass % of said one or more 4-poly(butylenyl)benzene sulphonic acids of Additive A, based on the total mass of all said one or more 4-poly(butylenyl)benzene sulphonic acids, has greater than or equal to 60 total carbon atoms in said substituent group, as determined by GC in accordance with ASTM D2887.

Suitably, the poly(butylenyl) substituent group of from 40 to 70, preferably 40 to 65, mass % of said one or more 4-poly(butylenyl)benzene sulphonic acid(s) of Additive A, based on the total mass of all said one or more 4-poly(butylenyl)benzene sulphonic acid(s), has from 32 to 56 total carbon atoms in said substituent group, as determined by GC in accordance with ASTM D2887.

Suitably, the poly(butylenyl) substituent group of said one or more 4-poly(butylenyl)benzene sulphonic acids includes a poly(butylenyl) substituent group having 32, 36, 40, 44 and/or 48, preferably 32, 36 and/or 40, total carbon atoms.

Suitably, Additive A has a number average molecular weight ($M_n$) of greater than or equal to 550, preferably greater than or equal to 600, more preferably greater than or equal to 650, daltons, as determined by the liquid-liquid extraction and two-phase potentiometric titration method described herein.

Suitably, Additive A has a number average molecular weight ($M_n$) of less than or equal to 800, preferably less than or equal to 750, more preferably less than or equal to 700, daltons, as determined by the liquid-liquid extraction and two-phase potentiometric titration method described herein.

Suitably, Additive A has a polydispersity index of from 1.1 to 1.5, preferably 1.2 to 1.4.

Suitably, the poly(butylenyl) substituent groups of said one or more 4-poly(butylenyl)benzene sulphonic acids have a branched chain structure. In other words, the poly(butylenyl) substituent group of said one or more 4-poly(butylenyl)benzene sulphonic acids comprises one or more branched chain butanediyl repeating radicals.

Suitably, the poly(butylenyl) substituent groups of the one or more 4-poly(butylenyl)benzene sulphonic acids comprises poly(butylenyl) substituent groups bonded by the C-2 or C-1 position of the poly(butylenyl) group to the para-position of benzene ring.

Additive A may be present in the crude oil in an amount of from 1 to 10000, preferably 1 to 5000, more preferably 1 to 1000, even more preferably 1 to 500, even more preferably 1 to 100, even more preferably 1 to less than 100, ppm by mass, based on the total mass of the crude oil.

Suitably, Additive A, as defined herein, may be represented by one or more compounds of Formula I

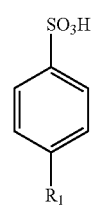

Formula I where each $R_1$ independently represents a poly(butylenyl) substituent group, as defined herein.

Additive A is added to the crude oil before the crude oil is refined in a petroleum refinery operation at a petroleum refinery. Additive A may be added to the crude oil when the crude oil is at the petroleum refinery and/or before the crude oil arrives at the petroleum refinery. Preferably, Additive A is added to the crude oil before the crude oil arrives at the petroleum refinery.

Suitably, Additive A is added to the crude oil at one or more crude oil production and/or processing stages before the crude oil arrives at a petroleum refinery selected from: (i) to a crude oil in a subterranean crude oil reservoir during an extraction process of the crude oil from the reservoir, for example, by injecting the additive(s) into the crude oil reservoir via the wellbore; (ii) to a crude oil during the storage of the crude oil, for example, to a crude oil being stored in storage tanks, which tanks may be located at the wellbore region, or at intermediate locations between the wellbore region and the petroleum refinery; (iii) to a crude oil during the transportation of a crude oil, for example, to a crude oil being transported by pipeline, ship, rail, oil tanker, especially to a crude oil being transported from the wellbore region to a petroleum refinery; (iv) to a crude oil before or during the processing of a crude oil before the crude oil is at a petroleum refinery, for example, to a crude oil being blended with a different type of crude oil, and/or hydrocarbon fluid, to form a crude oil blend. Preferably, Additive A is added to the crude oil at one or more crude oil production process stages before the crude oil is at a petroleum refinery selected from: (i) to a crude oil during the storage of a crude oil at the wellbore region and locations between the wellbore region and petroleum refinery; (ii) to a crude oil during the transportation of a crude oil being transported from the wellbore region to a petroleum refinery; and, (iii) to a crude oil before or during the processing of a crude oil before the crude oil is at a petroleum refinery, for example, to a crude oil being blended with a different type of crude oil, and/or hydrocarbon fluid, to form a crude oil blend.

Additive A may be added to a crude oil by methods well known to those skilled in the art. For example, Additive A may be blended into the crude oil and/or injected into a flowline transporting the crude oil.

Suitable Additives A for use in the invention are available from Infineum UK Limited.

Additive B

Additive B is one or more 4-poly(propylenyl)benzene sulphonic acid(s). The one or more 4-poly(propylenyl)benzene sulphonic acid(s) have a single sulphonic acid group and a single substituent group being the poly(propylenyl) substituent group attached to the para-position of the benzene ring with respect to the sulphonic acid group (i.e. the remainder of the benzene ring is not substituted and includes hydrogen atoms). It has been found that use of such mono-substituted one or more 4-poly(propylenyl)benzene sulphonic acid(s) typically increases the capacity of a crude oil to solvate and/or disperse asphaltenes, and/or increases the solubility and/or dispersancy of asphaltenes in a crude oil.

The one or more 4-poly(propylenyl)benzene sulphonic acid(s) includes the sulphonic acid group as the free acid. Additive B is ashless and does not include salts (e.g. metal salts) of the sulphonic acid.

Suitably, Additive B is derived from the polymerization of prop-1-ene.

Typically, Additive B may be synthesized by standard experimental techniques which are well-known to those skilled in the art. For example, Additive B may be synthesized by analogous techniques as described herein for Additive A by substituting the poly(butylene) reactant with the appropriate poly(propylene) reactant. Suitably, the integrity of the poly(propylenyl) substituent group of the intermediate one or more poly(propylenyl)benzene(s) (e.g. the mass % of poly(propylenyl) substituent group having a particular total number of carbon atoms) is essentially maintained during the sulphonation reaction of the intermediate. Accordingly, the mass % of poly(propylenyl) substituent group having a particular total number of carbon atoms in the intermediate one or more 4-poly(propylenyl)benzene(s) is essentially identical to the mass % of poly(propylenyl) substituent group having a particular total number of carbon atoms in the one or more 4-poly(propylenyl)benzene sulphonic acid(s) of Additive B.

The appropriate poly(propylene) reactant used to form the intermediate one or more 4-poly(propylenyl)benzene(s) may be produced by polymerizing propene, using an appropriate catalyst system e.g. boron trifluoride and water. Suitably, the characteristics of the poly(propylene) reactant (e.g. $M_n$, $M_w$, mass % of poly(butylene) having a particular number of total carbon atoms) should be substantially the same as the corresponding desired characteristics of the poly(propylenyl) substituent group in the intermediate one or more 4-poly(propylenyl)benzene(s) and in the one or more 4-poly(propylenyl)benzene sulphonic acid(s) of Additive B. Suitably, a preferred poly(propylene) reactant is obtained by polymerizing prop-1-ene wherein the poly(propylene) has: (i) a $M_n$ of from 250 to 400, preferably 300 to 375, daltons as measured by GC in accordance with ASTM D2887; (ii) greater than 55, preferably greater than 60, mass % of the poly(propylene), based on the total mass of poly(propylene), has greater than or equal to 21 total carbon atoms as determined by GC in accordance with ASTM D2887; and, (iii) less than 25 mass % of the poly(propylene), based on the total mass of poly(propylene), has greater than or equal to 30 total carbon atoms as determined by GC in accordance with ASTM D2887.

Suitably, a high proportion of the poly(propylenyl) substituent groups of Additive B have a narrow total carbon chain length distribution in which the poly(propylenyl) substituent group of greater than or equal to 55, preferably greater than or equal to 60, more preferably greater than or equal to 65, more preferably greater than or equal to 70, even more preferably greater than or equal to 75, mass % of said one or more 4-poly(propylenyl)benzene sulphonic acids of Additive B, based on the total mass of all said one or more 4-poly(propylenyl)benzene sulphonic acids, has greater than or equal to 21 total carbon atoms in said substituent group, as determined by GC in accordance with ASTM D2887. Suitably, the poly(propylenyl) substituent group of less than or equal to 30, preferably less than or equal to 25, more preferably less than or equal to 20, mass % of said one or more 4-poly(propylenyl)benzene sulphonic acids of Additive B, based on the total mass of all said one or more 4-poly(butylenyl)benzene sulphonic acids, has greater than or equal to 30 total carbon atoms in said substituent group, as determined by GC in accordance with ASTM D2887.

Suitably, the poly(propylenyl) substituent group of from 60 to 95, preferably 65 to 95, more preferably 70 to 90, mass % of said one or more 4-poly(propylenyl)benzene sulphonic acid(s) of Additive B, based on the total mass of all said one or more 4-poly(butylenyl)benzene sulphonic acid(s), has from 21 to 27 carbon atoms in said substituent group, as determined by GC in accordance with ASTM D2887.

Suitably, the poly(propylenyl) substituent group of said one or more poly(propylenyl)benzene sulphonic, acids of Additive B includes a poly(propylenyl) substituent group having 21, 24 and/or 27 total carbon atoms.

Suitably, Additive B has a number average molecular weight ($M_n$) of greater than or equal to 400, preferably greater than or equal to 450, more preferably greater than or equal to 475, daltons, as determined by the liquid-liquid extraction and two-phase potentiometric titration method described herein.

Suitably, Additive B has a number average molecular weight ($M_n$) of less than or equal to 600, preferably less than or equal to 550, more preferably less than or equal to 525, daltons as determined by the liquid-liquid extraction and two-phase potentiometric titration method described herein.

Suitably, Additive B has a polydispersity index of from 1.1 to 1.5.

Suitably, the poly(propylenyl) substituent group of said one or more 4-poly(propylenyl)benzene sulphonic acids have a branched chain structure. In other words, the poly(propylenyl) substituent group comprises one or more branched chain propanediyl repeating radicals.

Suitably, the poly(propylenyl) substituent group of the one or more 4-poly(propylenyl)benzene sulphonic acids comprises poly(propylenyl) substituent groups bonded by the C-2 or C-1 position of the poly(propylenyl) group to the para-position of the benzene ring.

Suitably, Additive B, as defined herein, may be represented by one or more compounds of Formula II

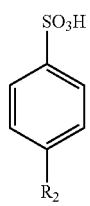

Formula II wherein each $R_2$ independently represents a poly(propylenyl) substituent group as defined herein.

Additive B may be present in the crude oil in an amount of from 1 to 10000, preferably 1 to 5000, more preferably 1 to 1000, even more preferably 1 to 500, even more preferably 1 to 100, even more preferably 1 to less than 100, ppm by mass, based on the total mass of the crude oil.

Additive B is added to the crude oil before the crude oil is refined in a petroleum refinery operation at a petroleum refinery. Additive B may be added to the crude oil when the crude oil is at the petroleum refinery and/or before the crude oil arrives at the petroleum refinery. Preferably, Additive B is added to the crude oil before the crude oil arrives at the petroleum refinery.

Suitably, Additive B is added to the crude oil at one or more crude oil production and/or processing stages before the crude oil arrives at a petroleum refinery selected from: (i) to a crude oil in a subterranean crude oil reservoir during an extraction process of the crude oil from the reservoir, for example, by injecting the additive(s) into the crude oil reservoir via the wellbore; (ii) to a crude oil during the storage of the crude oil, for example, to a crude oil being stored in storage tanks, which tanks may be located at the wellbore region, or at intermediate locations between the wellbore region and the petroleum refinery; (iii) to a crude oil during the transportation of a crude oil, for example, to a crude oil being transported by pipeline, ship, rail, oil tanker, especially to a crude oil being transported from the wellbore region to a petroleum refinery; (iv) to a crude oil before or during the processing of a crude oil before the crude oil is at a petroleum refinery, for example, to a crude oil being blended with a different type of crude oil, and/or hydrocarbon fluid, to form a crude oil blend. Preferably, Additive B is added to the crude oil at one or more crude oil production process stages before the crude oil is at a petroleum refinery selected from: (i) to a crude oil during the storage of a crude oil at the wellbore region and locations between the wellbore region and petroleum refinery; (ii) to a crude oil during the transportation of a crude oil being transported from the wellbore region to a petroleum refinery; and, (iii) to a crude oil before or during the processing of a crude oil before the crude oil is at a petroleum refinery, for example, to a crude oil being blended with a different type of crude oil, and/or hydrocarbon fluid, to form a crude oil blend.

Additive B may be added to a crude oil by methods well known to those skilled in the art. For example, Additive B may be blended into a crude oil and/or injected into a flowline transporting the crude oil.

Suitable Additives B for use in the invention are available from Infineum UK Limited.

Additive B, when used in combination with Additive A, may be added to the crude oil simultaneously or sequentially to Additive A. For example, a blend containing both of Additives A and B may be added to the crude oil; Additive A may be added to the crude oil initially followed by Additive B; or, Additive B may be added to the crude oil initially followed by Additive A. In a preferred embodiment when a combination of Additive A and Additive B is also added to the crude oil, both Additive A and Additive B are added to the crude oil essentially simultaneously.

Additive B, when used in combination with Additive A, may be added to the crude oil at the same one or more crude oil production and/or processing stages before the crude oil arrives at a petroleum refinery as Additive A, or Additive B may be added to the crude oil at a different one or more crude oil production and/or processing stages before the crude oil arrives at a petroleum refinery as Additive A. Preferably, Additive B is added to the crude oil at the same one or more crude oil production and/or processing stages as Additive A, more preferably Additive A and Additive B are added essentially simultaneously to the crude oil at the same stage of the refinery operation.

Suitably, when a combination of Additive A and Additive B is used, the combined treat rate of Additive A and Additive B is from 2 to 10000, preferably 2 to 5000, more preferably 2 to 1000, more preferably 2 to 200, even more preferably 2 to less than 100, ppm by mass, based on the total mass of the crude oil.

Suitably, when a combination of Additive A and Additive B is used, the mass:mass ratio of Additive A to Additive B is in the range of 20:1 to 1:20, such as 10:1 to 1:10, preferably 3:1 to 1:3. More preferably, Additive A is used in an amount in excess of Additive B and the mass:mass ratio of Additive A to Additive B is in the range of 20:1 to 1:1, such as 10:1 to 1:1, preferably 3:1 to 1:1.

Compositions

Additive A and/or Additive B may be used in compositions; the compositions may further contain a hydrophobic oil solubilizer and/or a dispersant for the additive(s). Such solubilizers may include, for example, surfactants and/or carboxylic acid solubilizers.

The compositions may further include, for example, viscosity index improvers, an i-foamants, antiwear agents, demulsifiers, anti-oxidants, and other corrosion inhibitors.

EXAMPLES

The present invention is illustrated by but in no way limited to the following examples.
Liquid-Liquid Extraction and Potentiometric Titration to Determine $M_n$ The $M_n$ of a 4-poly(alkylenyl)benzene sulphonic acid, such as Additive A and Additive B as defined herein, is determined by the following method.

The 4-poly(alkylenyl)benzene sulphonic acid (typically 3 g) is weighed, the sample weight in grams is recorded (sample weight recorded as $P_1$) and the sample dissolved in propan-2-ol (15 ml). An alcoholic solution of phenolphthalein indicator is added to the 4-poly(alkylenyl)benzene sulphonic acid/propan-2-ol solution and the solution titrated with aqueous sodium hydroxide (1 N) until the indicator turns pink (the volume of sodium hydroxide added is recorded as $V_1$). Aqueous hydrochloric acid (1 N) is then added dropwise to this solution until the pink colour of the indicator disappears. The resulting solution, taking into account the combined volume of aqueous sodium hydroxide and aqueous hydrochloric acid added to the original 4-poly(alkylenyl)benzene sulphonic acid/propan-2-ol solution, is made up to form a solution containing a volume to volume ratio of water to propan-2-ol of 1:1, by the addition of the minimum volume of water if the combined volume of aqueous sodium hydroxide and aqueous hydrochloric acid added is less than 15 ml or by the addition of the minimum volume of propan-2-ol if the combined volume of aqueous sodium hydroxide and aqueous hydrochloric acid added is more than 15 ml. The resulting solution is extracted with pentane (1×40 mL and then 2×20 mL) and the combined pentane extracts washed with a water/propan-2-ol solution (1:1 ratio by volume, 3×15 ml). The combined water/propan-2-ol extracts are warmed at 60° C. to remove any traces of pentane, allowed to cool to room temperature and made up to 100 mL with a water/propan-2-ol solution (1:1 by volume) to form the final poly(alkylenyl)benzene sulphonic acid-water/propan-2-ol solution.

40 mL of the final poly(alkylenyl)benzene sulphonic acid-water/propan-2-ol solution is transferred to an empty pre-weighed beaker (empty beaker weight recorded in grams as $P_2$), the solution evaporated to dryness under a stream of nitrogen at 70° C., the product dried in an oven at 130-150° C. for at least 1 hour and then cooled to room temperature in a desiccator for 1 hour. The weight of the beaker and sample in grams is recorded as $P_3$. A further 40 mL of the final poly(alkylenyl)benzene sulphonic acid-water/propan-2-ol solution is transferred to a separating funnel, water (75 mL) and p-toluidine hydrochloride (2 g) added thereto and the resulting solution extracted with dichloromethane (1×40 mL and 2×20 ml). The combined dichloromethane extracts are added to a water/propan-2-ol solution (100 mL, 3:7 by volume) to form a two-phase solution. The two-phase solution is stirred and potentiometrically titrated against aqueous sodium hydroxide (0.1 N) using a Metrohm titration unit set to titrate at 20 microlitres; the volume of aqueous sodium hydroxide added to reach the end point is recorded as $V_2$.

To calibrate the potentiometric two-phase titration method, 40 mL of a water/propan-2-ol (1:1 by volume) solution not including any sample is transferred to a separating funnel, water (75 mL) and p-toluidine hydrochloride (2 g) added thereto and the resulting solution extracted with dichloromethane (1×40 mL and 2×20 ml). The dichloromethane extracts are added to a water/propan-2-ol solution (100 mL, 3:7 by volume) to form a two-phase solution. The two-phase solution is stirred and potentiometrically titrated against aqueous sodium hydroxide (0.1 N) using a Metrohm titration unit; the volume of aqueous sodium hydroxide added to reach the end point is recorded as $V_3$.

The number average molecular ($M_n$) of the 4-poly(alkylenyl)benzene sulphonic acid is calculated by the following equation:

$$Mn = \left(\left((P_3 - P_2) - \frac{A \times P_1 \times 71}{100 \times 49 \times 2.5}\right) \times \frac{1000}{(V_2 - V_3) \times N}\right) - 22$$

wherein:
$P_3$=weight (g) of beaker plus sample;
$P_2$=weight (g) of empty beaker;
A=mineral acidity of the 4-poly(alkylenyl)benzene sulphonic acid expressed as mass % of sulphuric acid as determined from ASTM D4711;
$P_1$=sample weight (g);
$V_2$=volume (ml) of NaOH (0.1 N) added to the sample during potentiometric titration;
$V_3$=volume (ml) of NaOH (0.1 N) added to two-phase solution during calibration of potentiometric titration;
N=Normality of sodium hydroxide solution use in potentiometric titration which is 0.1.

Gel Permeation Chromatography to Determine $M_n$ of Poly(Butylene)

$M_n$ of poly(butylene) is determined by gel permeation chromatography (see W. W. Yau, J. J. Kirkland and D. D. Bly, "Modern Size Exclusion Liquid Chromatography", John Wiley and Sons, New York, 1979) using a MIXED-D PLgel HPLC column from Agilent Technologies Inc, a refractive index detector (30° C.), a tetrahydrofuran mobile phase of 1 ml/minute and calibrated with an EasiCal PS-2 polystyrene standard from Agilent Technologies Inc.

Gas Chromatography and FID in Accordance with ASTM D2887

$M_w$ of Additive A, $M_w$ of Additive B, $M_w$ of the poly(butylene) used to synthesise Additive A, and $M_w$ and $M_n$ of the poly(propylene) used to synthesise Additive B, is determined by gas chromatography (GC) and simulated distillation using a flame ionization detector (FID) in accordance with ASTM D2887. Suitably, this analytical method yields the mass % distribution of poly(alkylenyl) substituent groups in Additive A and Additive B, respectively, having a specific total number of carbon atoms. Suitably, this analytical method yields the mass % distribution of poly(alkylene) chains in poly(butylene) and in poly(propylene) having a specific total number of carbon atoms.

The ASTM D2887 equipment and operating conditions are as follows: the chromatograph is not equipped with cryogenics since the starting temperature is 35° C.; samples are diluted in pentane instead of carbon disulfide; the equipment is calibrated using reference Boiling Point Calibration Sample 1 from Agilent Technologies Inc, Part Number 5080-8716, dissolved in carbon disulfide (i.e. a n-parrafinic sample of known composition); the gas chromatograph is a Hewlett Packard 5890 Series 2 Plus Chromatograph having a Restek MXT-1HT SimDist column, length 5 m, diameter 0.53 mm, film thickness 10 μm; the carrier gas is helium and an output flow of 6 ml/minute; the detector is a flame ionization detector; the oven temperature is set at 35° C. for 2 minutes then heated at a rate of 8° C./min to reach 410° C. and then held at this temperature for 15 minutes; injector type: on-column; the initial injector temperature is 38° C. and final temperature is 413° C. (injector temperature=oven temperature+3° C.); the FID detector temperature is 400° C.

Components

The following additive components and crude oil were used.

Component (A)

Component A represents Additive A as defined herein.

(i) Synthesis of Poly(butylene)

In a continuous process, a Raffinate II stream is polymerised using a concentrated hydrochloric acid and ethyl aluminium dichloride catalyst system (mass to mass ratio of HCl to $EtAlCl_2$ of 3:1) in Isopar-L solvent at a temperature of 25 to 45° C. for 30 minutes. The reactor product is washed with water and sodium hydroxide, and the product stripped of unreacted $C_4$ butylene/butanes (temperature of 200 to 230° C., pressure less than 0.5 bar) to produce poly(butylene) having: a $M_n$ of 540 daltons as measured by gel permeation chromatography; a polydispersity index of 1.3; greater than 55 mass of the poly(butylene), based on the total mass of poly(butylene), has greater than or equal to 32 total carbon atoms as determined by GC in accordance with ASTM D2887.

(ii) Synthesis of 1-poly(butylenyl)benzene

In a continuous process, poly(butylene) (I mole) from step (i) and benzene (14.5 mole) are reacted in the presence of an aluminium trichloride/hydrochloric acid catalyst slurry at a temperature of 3 to 8° C. for 45 minutes. The sludge is removed from the reactor and the remaining liquid phase in the reactor is washed multiple times with aqueous sodium hydroxide (7 wt %) at a temperature of 90 to 100° C., then washed with water and then the organic liquid phase distilled at 160 to 170° C. (atmospheric pressure) to remove excess benzene and to remove the lower boiling 1-poly(butylenyl)benzenes in which the poly(butylenyl) substituent group has less than 16 total carbon atoms. The desired 1-poly(butylenyl)benzene product is obtained by distillation at 320° C. under reduced pressure (20 to 40 mm Hg) to produce 1-poly(butylenyl)benzenes having: (i) a polydispersity of 1.3; (ii) the poly(butylenyl) substituent group of greater than or equal to 55 mass % of said one or more 1-poly(butylenyl)benzenes has greater than or equal to 32 total carbon atoms in said substituent group as determined by GC in accordance with ASTM D2887; (iii) the poly(butylenyl) substituent group of from 40 to 70 mass % of said one or more 1-poly(butylenyl)benzenes has from 32 to 56 total carbon atoms in said substituent group as determined by GC in accordance with ASTM D2887; (iv) the poly(butylenyl) substituent group of less than or equal to 25 mass % of said one or more 1-poly(butylenyl)benzenes has greater than or equal to 60 total carbon atoms in said substituent group as determined by GC in accordance with ASTM D2887; (v) the poly(butylenyl) substituent group comprises a poly(butylenyl) substituent group having 32, 36 and/or 40 total carbon atoms; and, (vi) the poly(butylenyl) substituent group comprises poly(butylenyl) substituents having a branched chain structure.

(iii) Synthesis of 4-poly(butylenyl)benzene Sulphonic Acid

A reactor is charged with the 1-poly(butylenyl)benzene product from step (ii), an excess of sulfur dioxide introduced with stirring (volume ratio of sulfur dioxide to 4-poly(butylenyl)benzene of 4:1) while maintaining the reaction temperature between 0 and −5° C., after which an excess of sulfur trioxide (mole ratio of sulfur trioxide to 4-poly(butylenyl)benzene of 120:1) is introduced while maintaining the reaction temperature between 0 and −5° C. The reaction mixture is then allowed to stand for 1 hour at a temperature of −2 to 5° C. The excess sulfur dioxide/sulfur trioxide is stripped off at 120° C. at 0.1 bar and the reaction mixture cooled to 60° C. to yield the title compound. The title compound may be diluted in diluent oil, such as SN80 (commercially available from Repsol).

The isolated 4-poly(butylenyl)benzene sulphonic acid has: (i) a $M_n$ of between 600 to 700 daltons; (ii) a polydispersity of 1.3; (iii) the poly(butylenyl) substituent group of greater than or equal to 55 mass % of said one or more 4-poly(butylenyl)benzene sulphonic acid(s) has greater than or equal to 32 total carbon atoms in said substituent group as determined by GC in accordance with ASTM 02887; (iv) the poly(butylenyl) substituent group of from 40 to 70 mass % of said one or more 4-poly(butylenyl)benzene sulphonic acid(s) has from 32 to 56 total carbon atoms in said substituent group as determined by GC in accordance with ASTM 02887; (v) the poly(butylenyl) substituent group of less than or equal to 25 mass % of said one or more 4-poly(butylenyl)benzene sulphonic acid(s) has greater than or equal to 60 total carbon atoms in said substituent group as determined by GC in accordance with ASTM 02887; (vi) the poly(butylenyl) substituent group comprises a poly(butylenyl) substituent group having 32, 36 and/or 40 total carbon atoms; and, (vii) the poly(butylenyl) substituent group comprises poly(butylenyl) substituents having a branched chain structure.

Suitable Additives A are available from Infineum UK Ltd, for example, comprising 83 mass % a.i. of 4-poly(butylenyl)benzene sulphonic acids.

Component (B)

Component B represents Additive B as defined herein.

(i) Synthesis of Poly(propylene)

A sealed reactor is charged with propene, boron trifluoride catalyst and water as cocatalyst (molar ratio of boron trifluoride to water of 1:2) at 24 to 28° C. and a pressure of 16 bar, and the resulting reaction mixture agitated for 1 hour. The reaction mixture is then heated to 50° C. (atmospheric pressure) initially, and then to 90 to 120° C. under vacuum (60 mbar) to distil off residual propane, boron trifluoride and boron trifluoride/water complex. The residual purified poly(propylene) remaining in the reactor is cooled and stored at 60° C., the poly(propylene) has: (i) a $M_n$ of 340 daltons as measured by GC in accordance with ASTM D2887; (ii) greater than 65 mass % of the poly(propylene), based on the total mass of poly(propylene), has greater than or equal to 21 total carbon atoms as determined by GC in accordance with ASTM D2887; and, (iii) less than 25 mass % of the poly(propylene), based on the total mass of poly(propylene), has greater than or equal to 30 total carbon atoms as determined by GC in accordance with ASTM D2887.

(ii) Synthesis of 1-poly(propylenyl)benzene

The title compound is synthesised from poly(propylene) obtained from step (i) using the same procedure to form 1-poly(butylenyl)benzene as described in step (ii) for Component A using a mole to mole ratio of benzene to poly(propylene) of 7.5:1.

The 1-poly(propylenyl)benzene product is obtained by distillation at 295° C. under reduced pressure (20 to 40 mm Hg) to produce 1-poly(propylenyl)benzenes wherein: (i) the poly(propylenyl) substituent group of greater than or equal to 60 mass % of said one or more 1-poly(propylenyl)benzenes has greater than or equal to 21 total carbon atoms in said substituent group as determined by GC in accordance with ASTM D2887; (ii) the poly(propylenyl) substituent group of from 65 to 90 mass % of said one or more 1-poly(propylenyl)benzenes has from 21 to 27 total carbon atoms in said substituent group as determined by GC in accordance with ASTM D2887; (iii) the poly(propylenyl) substituent group of less than or equal to 25 mass % of said one or more 1-poly(propylenyl)benzenes has greater than or equal to 30 total carbon atoms in said substituent group as determined by GC in accordance with ASTM D2887; (v) the poly (propylenyl) substituent group comprises a poly(propylenyl) substituent group having 21, 24 and/or 27 total carbon atoms; and, (v) the poly(propylenyl) substituent group comprises poly(propylenyl) substituents having a branched chain structure.

(iii) Synthesis of 4-Poly(Propylenyl)Benzene Sulphonic Acid

The title compound is synthesised from the 1-poly(propylenyl)benzene product of step (ii) using the same procedure to form 4-poly(butylenyl)benzene sulphonic acid as described in step (iii) for Component A.

The isolated 4-poly(propylenyl)benzene sulphonic acid has: (i) a $M_n$ of between 450 to 550 daltons; (ii) the poly(propylenyl) substituent group of greater than or equal to 60 mass % of said one or more 4-poly(propylenyl) benzene sulphonic acid(s) has greater than or equal to 21 total carbon atoms in said substituent group as determined by GC in accordance with ASTM D2887; (iii) the poly (propylenyl) substituent group of from 65 to 90 mass of said one or more 4-poly(propylenyl)benzene sulphonic acid(s) has from 21 to 27 total carbon atoms in said substituent group as determined by GC in accordance with ASTM D2887; (iv) the poly(propylenyl) substituent group of less than or equal to 25 mass % of said one or more 4-poly (propylenyl)benzene sulphonic acid(s) has greater than or equal to 30 total carbon atoms in said substituent group as determined by GC in accordance with ASTM D2887; (v) the poly(propylenyl) substituent group comprises a poly(propylenyl) substituent group having 21, 24 and/or 27 total carbon atoms; and, (vi) the poly(propylenyl) substituent group comprises poly(propylenyl) substituents having a branched chain structure Suitable Additives B are available from Infineum UK Ltd, for example, comprising 85 mass % a.i. of 4-poly(propylenyl)benzene sulphonic acids.

Crude Oil Blend

A blend of a Columbian heavy crude oil (asphaltene content 10 wt %) and a shale oil in a weight to weight ratio of 1:1.

Crude Oil Asphaltene Stability Test

The test is performed using an Automated Stability Analyser from Rofa France in accordance with ASTM D7157. The test demonstrates the ability of a crude oil to resist destabilisation upon the addition of heptane. Results are recorded as 'S' values, the intrinsic stability of the oil with respect to precipitation of asphaltenes therefrom. Higher 'S' values indicate that the oil has a higher capacity to solvate and/or disperse asphaltenes, and the oil is more stable in respect of asphaltene flocculation and/or precipitation. The results herein are reported as a "Relative 'S' Value" with respect to the crude oil blend not including Additive A and/or Additive B.

Results

| Additive(s) (treat rate; ppm a.i.) | Ratio of A:B (treat rate; ppm a.i.) | Relative S-Value |
| --- | --- | --- |
| None | — | 1.00 |
| A (2075 ppm) | — | 1.19 |
| A (830 ppm) | — | 1.14 |
| B (850 ppm) | — | 1.05 |
| A + B (835 ppm) | 3:1 | 1.14 |

The results show that, when a single additive is used Additive A gave the best results (14% improvement over the control at a treat rate of 830 ppm by mass a.i.). Additive B also provided an improvement; albeit not as significant as Additive A, over the control (5% improvement at a treat rate of 850 ppm by mass a.i.). Increasing the treat rate of Additive A from 830 ppm by mass a.i. to 2075 ppm by mass a.i., provided a further marginal improvement in performance.

What is claimed is:

1. A method for enhancing the capacity of a crude oil to solvate and/or disperse asphaltenes in said crude oil, the method comprising adding an effective minor amount of Additive A or Additive B, or an effective minor amount of a combination of Additive A and Additive B, to the crude oil; wherein:
   (i) Additive A, when present, is present in an effective minor amount of from 1 to 10000 ppm by mass, based on the total mass of the crude oil, and Additive A comprises one or more 4-poly(butylenyl)benzene sulphonic acid(s), wherein the poly(butylenyl) substituent group of greater than 50 mass % of said one or more 4-poly(butylenyl)benzene sulphonic acid(s) of Additive A, based on the total mass of all said one or more 4-poly(butylenyl)benzene sulphonic acid(s), has greater than or equal to 32 total carbon atoms in said substituent group, as determined by GC, a number average molecular weight ($M_n$) of from 550 to 800 daltons, and a polydispersity index of from 1.1 to 1.5; and
   (ii) Additive B, when present, is present in an effective minor amount of from 1 to 10000 ppm by mass, based on the total mass of the crude oil, and Additive B comprises one or more 4-poly(propylenyl)benzene sulphonic acids, wherein the poly(propylenyl) substituent group of greater than 50 mass % of said one or more 4-poly(propylenyl)benzene sulphonic acid(s) of Additive B, based on the total mass of all said one or more 4-poly(propylenyl)benzene sulphonic acid(s), has greater than or equal to 21 total carbon atoms in said substituent group, as determined by GC.

2. The method as claimed in claim 1, wherein the crude oil has an asphaltene content.

3. The method as claimed in claim 1, wherein the crude oil comprises a single type of crude oil or a crude oil blend comprising two or more different types of crude oil.

4. The method as claimed in claim 1, wherein Additive A or Additive B, or a combination of Additive A and Additive B, is each independently added to the crude oil before said crude oil arrives at a petroleum refinery.

5. The method as claimed in claim 1, wherein Additive A or Additive B, or a combination of Additive A and Additive B, is each independently added to the crude oil at one or more crude oil production and/or processing stages, selected from: (i) to the crude oil residing in a subterranean crude oil reservoir; (ii) to the crude oil during storage of the crude oil;

(iii) to the crude oil during transportation of the crude oil; and (iv) to the crude oil before or during a blending process of the crude oil.

6. The method as claimed in claim 1, wherein Additive A is added to the crude oil.

7. The method as claimed in claim 1, wherein Additive A and Additive B are used in combination.

8. The method as claimed in claim 7, wherein the mass: mass ratio of Additive A to Additive B is in the range of 10:1 to 1:10.

9. The method as claimed in claim 7 wherein the combined treat rate of Additive A and Additive B is from 2 to 10000 ppm by mass, based on the total mass of the crude oil.

10. The method as claimed in claim 8, wherein the combined treat rate of Additive A and Additive B is from 2 to 10000 ppm by mass, based on the total mass of the crude oil.

11. The method as claimed in claim 1, wherein the poly(butylenyl) substituent group of less than 30 mass % of said one or more 4-poly(butylenyl)benzene sulphonic acid(s) of Additive A, based on the total mass of all said one or more 4-poly(butylenyl)benzene sulphonic acid(s) of Additive A, has greater than or equal to 60 total carbon atoms in said substituent group, as determined by GC.

12. The method as claimed in claim 1, wherein the poly(butylenyl) substituent group of said one or more 4-poly(butylenyl)benzene sulphonic acid(s) of Additive A is derived from the polymerization of but-1-ene and has a branched chain structure.

13. The method as claimed in claim 1, wherein the poly(propylenyl) substituent group of less than or equal to 25 mass % of said one or more 4-poly(propylenyl)benzene sulphonic acid(s) of Additive B, based on the total mass of all said one or more 4-poly(propylenyl)benzene sulphonic acid(s) of Additive B, has greater than 30 total carbon atoms in said substituent group, as determined by GC.

14. The method as claimed in claim 1, wherein the poly(propylenyl) substituent group of said one or more 4-poly(propylenyl)benzene sulphonic acid(s) of Additive B has a number average molecular weight ($M_n$) of from 400 to 600 daltons.

15. The method as claimed in claim 1, wherein the poly(propylenyl) substituent group of said one or more 4-poly(propylenyl)benzene sulphonic acids of Additive B is derived from the polymerization of prop-1-ene and has a branched chain structure.

16. The method as claimed in claim 1, wherein the crude oil is at ambient temperature.

17. The method as claimed in claim 1, wherein Additive A or Additive B, or a combination of Additive A and Additive B, are used with or as emulsion-breakers (for demulsification), corrosion inhibitors, hydrate inhibitors, scale inhibitors, flow improvers, wax deposition inhibitors (or paraffin suppressants), pour-point depressants, viscosity improvers and/or other additives.

\* \* \* \* \*